United States Patent
Ikeda et al.

(10) Patent No.: US 11,518,372 B2
(45) Date of Patent: Dec. 6, 2022

(54) VEHICLE DRIVING ASSIST APPARATUS

(71) Applicant: Toyota Jidosha Kabushiki Kaisha, Toyota (JP)

(72) Inventors: Masayuki Ikeda, Nisshin (JP); Toru Miyamoto, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/793,449

(22) Filed: Feb. 18, 2020

(65) Prior Publication Data

US 2020/0262420 A1 Aug. 20, 2020

(30) Foreign Application Priority Data

Feb. 20, 2019 (JP) .............................. JP2019-027978

(51) Int. Cl.
*B60W 50/02* (2012.01)
*B60W 30/09* (2012.01)
*B60W 40/04* (2006.01)
*B60W 50/029* (2012.01)

(52) U.S. Cl.
CPC ............ *B60W 30/09* (2013.01); *B60W 40/04* (2013.01); *B60W 50/0225* (2013.01); *B60W 2050/0295* (2013.01); *B60W 2050/0297* (2013.01)

(58) Field of Classification Search
CPC .. B60W 30/09; B60W 50/0225; B60W 40/04; B60W 2050/0295; B60W 2050/0297
See application file for complete search history.

(56) References Cited

U.S. PATENT DOCUMENTS

| 7,174,248 B2 * | 2/2007 | Suzuki .............. G01C 21/3697 |
| | | 342/357.52 |
| 2017/0072967 A1 * | 3/2017 | Fendt ..................... B60W 10/18 |
| 2020/0066069 A1 * | 2/2020 | Kapoor ................ G07C 5/0825 |

FOREIGN PATENT DOCUMENTS

| DE | 10343199 A1 * | 4/2005 | ............. B60K 31/00 |
| JP | 2002-154393 A | 5/2002 | |
| KR | 1020170068059 * | 6/2017 | ............ B60W 50/02 |

* cited by examiner

*Primary Examiner* — Sze-Hon Kong
*Assistant Examiner* — Chanmin Park
(74) *Attorney, Agent, or Firm* — Dinsmore & Shohl LLP (57) ABSTRACT

A vehicle driving assist apparatus has surrounding sensors which detect vehicle surrounding situations and driving assist systems which assist a driving operation of a driver, based on the vehicle surrounding situations. The vehicle driving assist apparatus determine whether the surrounding sensors malfunction. When the at least one electronic control unit determines that at least one of the surrounding sensors malfunctions, the vehicle driving assist apparatus determine operable driving assist systems and inoperable driving assist systems, and causes a display device to display both of a display indicating that at least one of the surrounding sensors malfunctions and a display indicating a list of the operable driving assist systems and the inoperable driving assist systems in a manner that the driver can realize which driving assist systems are operable and which driving assist systems are inoperable.

16 Claims, 5 Drawing Sheets

|  | FORWARD SENSORS | |
|---|---|---|
|  | CAMERA SENSOR | RADAR SENSOR |
| PCS SYSTEM | X | X |
| ACC SYSTEM | X | X |
| LTA SYSTEM | X | Y |
| RSA SYSTEM | X | Z |

VEHICLE DRIVING ASSIST APPARATUS

CROSS-REFERENCE TO RELATED APPLICATIONS

The present application claims priority to Japanese patent application No. 2019-027978 filed on Feb. 20, 2020, the content of which is hereby incorporated by reference in its entirety.

BACKGROUND

Field

The present disclosure relates to a vehicle driving assist apparatus installed with driving assist systems for assisting driving operations of a driver of an own vehicle.

Description of the Related Art

There is known a vehicle driving assist apparatus for assisting a driving of a driver of an own vehicle. In general, the vehicle driving assist apparatus is installed with driving assist systems. The driving assist systems may be a pre-crush safety system, a lane tracing assist system, an adaptive cruise control system. The pre-crush safety system assists an operation of the driver to steer the own vehicle to avoid the own vehicle from colliding with obstacles detected ahead of the own vehicle by alerting the driver and controlling braking force. Hereinafter, the pre-crush safety system will be referred to as "the PCS system." The lane tracing assist system assists an operation of the driver to a steering wheel of the own vehicle to move the own vehicle in a movement lane. Hereinafter, the lane tracing assist system will be referred to as "the LTA system." The adaptive cruise control system assists an operation of the driver to an acceleration pedal of the own vehicle to follow another vehicle moving ahead of the own vehicle in consideration of a change of a movement speed of the other vehicle. Hereinafter, the adaptive cruise control system will be referred to as "the ACC system." Driving operations of the driver may be assisted by operations of the driving assist systems.

The vehicle driving assist apparatus comprises surrounding sensors which detect situations surrounding the own vehicle. The driving assist systems assist the driving of the driver, based on the situations surrounding the own vehicle detected by the surrounding sensors.

A malfunction display apparatus described in JP 2002-154393 A causes a display device to display marks which specify the malfunctioning driving assist systems. The driver can realize the driving assist systems which cannot assist the driving of the driver by confirming the marks displayed on the display device.

The malfunction display apparatus described above causes the display device to display the marks which specify the driving assist systems only which cannot assist the driving of the driver. Therefore, the driver may not easily realize which driving assist systems are operable and which driving assist systems are inoperable. In addition, the driver may not realize that at least one of the surrounding sensors malfunctions.

In general, the vehicle driving assist apparatus detects the situations surrounding the own vehicle, using the surrounding sensors. The driving assist systems commonly use the surrounding sensors. If the vehicle driving assist apparatus informs the driver that any one of the surrounding sensors malfunctions, the driver may realize that all the driving assist systems which uses the malfunctioning surrounding sensor cannot assist the driving operation of the driver. However, even when some of the surrounding sensors malfunction, some of the driving assist systems can assist the driving operation of the driver, using the surrounding sensors which do not malfunction.

In this case, the driver does not realize that some of the driving assist systems can assist the driving operation of the driver when some of the surrounding sensors malfunction. As a result, the driver cannot effectively use the driving assist systems.

SUMMARY

The present disclosure has been made for solving problems described above. One of objects of the present disclosure is to inform the driver of malfunction of the surrounding sensors such that the driver can effectively use the driving assist systems.

A vehicle driving assist apparatus according to the present disclosure comprises surrounding sensors and driving assist systems. The surrounding sensors detect situations surrounding an own vehicle as vehicle surrounding situations. The driving assist systems assist a driving operation of a driver, based on the vehicle surrounding situations detected by the surrounding sensors.

The vehicle driving assist apparatus according to the present disclosure further comprises at least one electronic control unit. The at least one electronic control unit is configured to determine whether the surrounding sensors malfunction. The at least one electronic control unit is further configured to determine (i) operable driving assist systems corresponding to the driving assist systems which can provide the driver with driving assist in a situation that at least one of the surrounding sensors malfunctions and (ii) inoperable driving assist systems corresponding to the driving assist systems which cannot provide the driver with the driving assist in a situation that at least one of the surrounding sensors malfunctions when the at least one electronic control unit determines that at least one of the surrounding sensors malfunctions. The at least one electronic control unit is further configured to cause a display device to display both of (i) a display indicating that at least one of the surrounding sensors malfunctions and (ii) a display indicating a list of the operable driving assist systems and the inoperable driving assist systems in a manner that the driver can realize which driving assist systems are operable and which driving assist systems are inoperable when the at least one electronic control unit determines that at least one of the surrounding sensors malfunctions.

The vehicle driving assist apparatus according to the present disclosure comprises the surrounding sensors, the driving assist systems, and the at least one electronic control unit.

The different surrounding sensors detect the situation surrounding the own vehicle. The driving assist systems assist the driving operation of the driver, based on the situation surrounding the own vehicle detected by the surrounding sensors. The vehicle driving assist apparatus comprises the driving assist systems. Therefore, the vehicle driving assist apparatus can provide the driver with different driving assist.

The electronic control unit determines whether the surrounding sensors malfunction. When the electronic control unit determines that at least one of the surrounding sensors malfunctions, the electronic control unit determine (i) the operable driving assist systems and (ii) the inoperable driving assist systems.

When the electronic control unit determines that at least one of the surrounding sensors malfunctions, the electronic control unit causes the display device to display both of (i) the display indicating that at least one of the surrounding sensors malfunctions and (ii) the display indicating the list of the operable driving assist systems and the inoperable driving assist systems in a manner that the driver can realize which driving assist systems are operable and which driving assist systems are inoperable.

Thereby, the driver can realize the malfunction of at least one of the surrounding sensors, the operable driving assist systems, and the inoperable driving assist systems at a glance when at least one of the surrounding sensors malfunctions.

As a result, the driver can effectively use the driving assist systems even when at least one of the surrounding sensors malfunctions.

According to an aspect of the present disclosure, the at least one electronic control unit may be further configured to display the driving assist systems in a manner that the operable driving assist systems are displayed in one group, and the inoperable driving assist systems are displayed in another group.

According to this aspect of the present disclosure, the driving assist systems are displayed in a manner that the operable driving assist systems are displayed in one group, and the inoperable driving assist systems are displayed in another group. In other words, the driving assist systems are displayed as a group of the operable driving assist systems and a group of the inoperable driving assist systems. Thereby, the driver can easily realize the operable driving assist systems and the inoperable driving assist systems.

According to another aspect of the present disclosure, the surrounding sensors may include (i) a camera sensor which detects the situation ahead of the own vehicle as the vehicle surrounding situation and (ii) a radar sensor which detects the situation ahead of the own vehicle as the vehicle surrounding situation. In this case, the at least one electronic control unit may be further configured to display that one of the camera sensor and the radar sensor malfunctions, using a name collectively expressing both of the camera sensor and the radar sensor even when the at least one electronic control unit determines that one of the camera sensor and the radar sensor malfunctions.

When the camera sensor malfunctions, it is unnecessary for the driver to display that the camera sensor malfunctions. Similarly, when the radar sensor malfunctions, it is unnecessary for the driver to display that the radar sensor malfunctions. If the display device displays that the camera sensor malfunctions, or the radar sensor malfunctions, the driver may be confused. According to this aspect of the present disclosure, the malfunctioning sensor is displayed, using the name collectively expressing both of the camera sensor and the radar sensor when one of the camera sensor and the radar sensor malfunctions. In particular, the malfunctioning sensor is displayed, using the name such as "forward sensor". Thereby, the driver can easily realize malfunctioning part.

A vehicle driving assist apparatus according to another embodiment comprises a first surrounding sensor, a second surrounding sensor, and at least one electronic control unit.

The first surrounding sensor detects a first vehicle surrounding situation corresponding to a situation surrounding an own vehicle to which the vehicle driving assist apparatus is applied. The second surrounding sensor detects a second vehicle surrounding situation corresponding to the situation surrounding the own vehicle.

The at least one electronic control unit executes (i) a first driving assist system for assisting a driving operation of a driver of the own vehicle, using the first vehicle surrounding situation and the second vehicle surrounding situation and (ii) a second driving assist system for assisting the driving operation, using the first vehicle surrounding situation without using the second vehicle surrounding situation.

The at least one electronic control unit is configured to determine whether the first surrounding sensor malfunctions and whether the second surrounding sensor malfunctions. The at least one electronic control unit is further configured to cause a display device of the own vehicle to display that (i) at least one of the first and second surrounding sensors malfunctions, (ii) the first driving assist system is inoperable, and (iii) the second driving assist system is operable when the at least one electronic control unit determines that the first surrounding sensor does not malfunction, and the second surrounding sensor malfunctions.

According to an aspect of the other embodiment, the at least one electronic control unit may be further configured to execute a third driving assist system for assisting the driving operation of the driver, using at least one of the first vehicle surrounding situation and the second vehicle surrounding situation. In this case, the at least one electronic control unit may be further configured to cause the display device to display operable driving assist systems of the first to third driving assist systems in one group and inoperable driving assist systems of the first to third driving assist systems in another group when the at least one electronic control unit determines that the first surrounding sensor does not malfunction, and the second surrounding sensor malfunctions.

According to another aspect of the other embodiment, the first surrounding sensor may detect the situation surrounding the own vehicle within a predetermined range as the first vehicle surrounding situation, and the second surrounding sensor may detect the situation surrounding the own vehicle within the predetermined range as the second vehicle surrounding situation. In this case, the at least one electronic control unit may be further configured to cause the display device to display that at least one of the first and second surrounding sensors malfunctions, using a name collectively expressing both of the first and second surrounding sensors when the at least one electronic control unit determines that the first surrounding sensor does not malfunction, and the second surrounding sensor malfunctions.

According to further another aspect of the other embodiment, the first surrounding sensor may detect the situation ahead of the own vehicle as the first vehicle surrounding situation, and the second surrounding sensor may detect the situation ahead of the own vehicle as the second vehicle surrounding situation.

According to further another aspect of the embodiment, the first surrounding sensor may be a camera sensor, and the second surrounding sensor may be a radar sensor.

According to further another aspect of the other embodiment, the vehicle driving assist apparatus may further comprise a setting operation device operated by the driver to operate the first and second driving assist systems, respectively.

According to further another aspect of the other embodiment, the first driving assist system may automatically control at least one of an acceleration, a deceleration and a steering of the own vehicle, and the second driving assist system may automatically control at least one of the acceleration, the deceleration and the steering of the own vehicle.

Elements of the present disclosure are not limited to elements of embodiments and modified examples of the present disclosure described along with the drawings. The other objects, features and accompanied advantages of the present disclosure can be easily understood from the embodiments and the modified examples of the present disclosure.

DESCRIPTION OF THE EMBODIMENTS

Below, a vehicle driving assist apparatus according to an embodiment of the present disclosure will be described with reference to the drawings.

Figure 1:
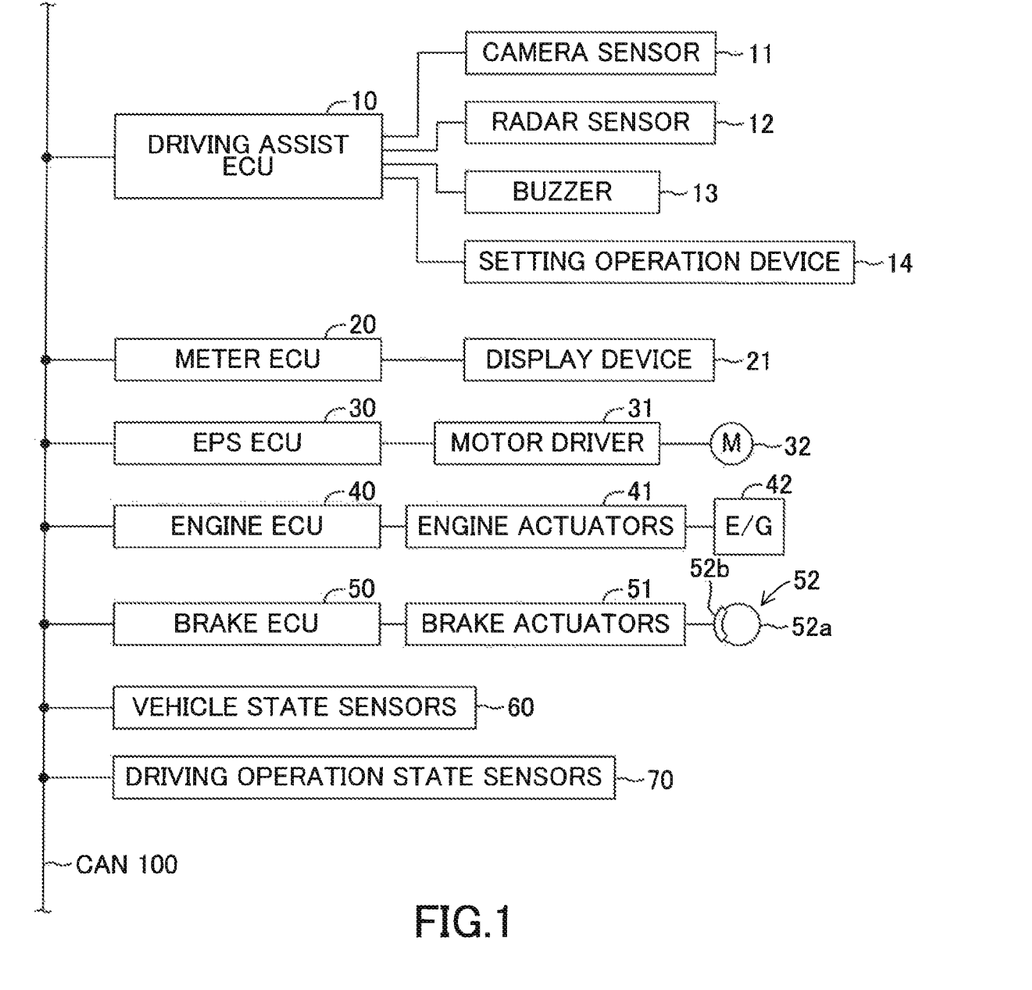
FIG. 1 is a view which shows a general configuration of a driving assist apparatus according to an embodiment of the present disclosure.

The vehicle driving assist apparatus according to the embodiment of the present disclosure is applied to a vehicle. Hereinafter, the vehicle to which the vehicle driving assist apparatus according to the embodiment of the present disclosure is applied, will be referred to as "the own vehicle" in order to distinguish the vehicle to which the vehicle driving assist apparatus according to the embodiment of the present disclosure is applied, from other vehicles. As shown in FIG. 1, the vehicle driving assist apparatus according to the embodiment of the present disclosure includes a driving assist ECU 10, a meter ECU 20, an electric power steering ECU 30, an engine ECU 40, and a brake ECU 50.

Each of the ECUs 10, 20, 30, 40, and 50 is an electronic control unit including a micro-computer as a main component. The ECUs 10, 20, 30, 40, and 50 are electrically connected to communicate information via the CAN 100. In this embodiment, the micro-computer includes a CPU, a ROM, a RAM, a non-volatile memory, and an interface I/F. The CPU is configured to realize various functions by executing instructions, programs, and routines memorized in the ROM. Two or more all of the ECUs 10, 20, 30, 40, and 50 may be integrated into one ECU.

Vehicle state sensors 60 and driving operation state sensors 70 are electrically connected to the CAN 100. The vehicle state sensors 60 detect vehicle states. The driving operation state sensors 70 detect driving operation states. The vehicle state sensors 60 may include a vehicle movement speed sensor, a longitudinal acceleration sensor, a lateral acceleration sensor, and a yaw rate sensor. The vehicle movement speed sensor detects a movement speed of the own vehicle. The longitudinal acceleration sensor detects a longitudinal acceleration of the own vehicle. The lateral acceleration sensor detects a lateral acceleration of the own vehicle. The yaw rate sensor detects a yaw rate of the own vehicle.

The driving operation state sensors 70 include an acceleration pedal operation amount sensor, a brake pedal operation amount sensor, a brake switch, a steering angle sensor, a steering torque sensor, and a shift position sensor. The acceleration pedal operation amount sensor detects an amount of operation applied to an acceleration pedal of the own vehicle. The brake pedal operation amount sensor detects an amount of operation applied to a brake pedal of the own vehicle. The brake switch detects whether the brake pedal is operated. The steering angle sensor detects a steering angle of the own vehicle. The steering torque sensor detects a steering torque applied to a steering shaft of the own vehicle via a steering wheel of the own vehicle by a driver of the own vehicle. The shift position sensor detects a shift position of a transmission of the own vehicle.

Information detected by the vehicle state sensors 60 and the driving operation state sensors 70 is sent to the CAN 100. Hereinafter, the information detected by the vehicle state sensors 60 and the driving operation state sensors 70 will be referred as to "the sensor information." The ECUs 10, 20, 30, 40, and 50 use the sensor information sent to the CAN 100. The sensor information may be information detected by a sensor electrically connected to one or more of the ECUs 10, 20, 30, 40, and 50 and be sent to the CAN 100 from the one or more of the ECUs 10, 20, 30, 40, and 50 electrically connected to the sensor. For example, the acceleration pedal operation amount sensor may be electrically connected to the engine ECU 40. In this case, the sensor information on the amount of the operation applied to the acceleration pedal is sent to the CAN 100 from the engine ECU 40. Similarly, the steering angle sensor may be electrically connected to the electric power steering ECU 30. In this case, the sensor information on the steering angle is sent to the CAN 100 from the electric power steering ECU 30. The other sensors may be configured in the similar manner.

Alternatively, two or more of the ECUs 10, 20, 30, 40, and 50 may be configured to communicate the sensor information therebetween without the CAN 100.

The driving assist ECU 10 is a main control unit which provides driving assists to the driver of the own vehicle. The driving assist ECU 10 is installed with systems each providing the driving assist to the driver. Hereinafter, the system providing the driving assist to the driver will be referred to as "the driving assist system." For example, the driving assist ECU 10 is installed with the driving assist systems such as a PCS system (i.e., pre-crush safety system), an LTA system (i.e., a lane tracing assist system), an ACC system (i.e., an adaptive cruise control system), and an RSA system (i.e., a road sign assist system). The driving assist systems installed in the driving assist ECU 10 are not limited to the systems described above. Various known driving assist systems may be installed in the driving assist ECU 10.

A camera sensor 11, a radar sensor 12, a buzzer 13, and a setting operation device 14 are electrically connected to the driving assist ECU 10. The camera sensor 11 and the radar sensor 12 are forward sensors which detect situations surrounding the own vehicle and ahead of the own vehicle. The forward sensors correspond to surrounding situation detection sensors including surrounding sensors which detect the situations surrounding the own vehicle of the present disclosure. When the driving assist ECU 10 is installed with the driving assist systems which provide the driving assist to the driver, based on a situation surrounding the own vehicle and behind the own vehicle, a rearward sensor which detects the situation surrounding the own vehicle and behind the own vehicle is electrically connected to the driving assist ECU 10.

The camera sensor 11 is provided at an upper part of a front windshield glass of the own vehicle in an interior of the own vehicle. The camera sensor 11 includes a camera section (not shown) and an image processing section (not shown). The image processing section analyzes data on images taken by the camera section. The camera sensor 11 (in particular, the camera section) takes images of a view ahead of the own vehicle. The camera sensor 11 (in particular, the image processing section) recognizes (i) lane markings provided on a road, (ii) road signs ahead of the own vehicle, and (iii) standing objects ahead of the own vehicle, based on the taken images. The camera sensor 11 (in particular, the image processing section) provides information on (i) the recognized lane markings, (ii) the recognized road signs, and (iii) the recognized standing objects to the driving assist ECU 10 with a predetermined interval.

Hereinafter, the information on the lane markings will be referred to as "the lane marking information", the information on the road signs will be referred to as "the road sign information", and the information on the standing objects" will be referred to as "the standing object information." The lane marking information includes information on (i) a positional relationship between the own vehicle and each recognized lane marking and (ii) a direction of each recognized lane marking relative to the own vehicle. The road sign information includes information on contents described on the recognized road signs such as regulation movement speed. The standing object information includes information on (i) kinds of the recognized standing objects, (ii) sizes of the recognized standing objects, and (iii) a positional relationship between the own vehicle and each recognized standing object.

The radar sensor 12 is provided on a front end of the own vehicle at a center of the own vehicle in a width direction of the own vehicle. The radar sensor 12 is a millimeter-wave radar sensor which detects the standing objects ahead of the own vehicle. The radar sensor 12 includes a radar transmitting-receiving section (not shown) and a signal processing section (not shown). The radar transmitting-receiving section transmits millimeter wave. The transmitted millimeter wave propagates, extending by a predetermined angle left and right directions relative to a radar axis. The radar axis extends straight forwards from the own vehicle. When an object such as vehicles, walking persons, and two-wheel vehicles, exists ahead of the own vehicle, the transmitted millimeter wave is reflected by the object. The radar transmitting-receiving section receives the reflected millimeter wave. The signal processing section detects the standing object ahead of the own vehicle and provides information on (i) a distance between the own vehicle and the detected standing object, (ii) a relative speed of the detected standing object relative to the own vehicle, and (iii) a positional relationship between the own vehicle and the standing object or a direction of the standing object relative to the own vehicle to the driving assist ECU 10, based on (i) a difference in phase between the transmitted millimeter wave and the received reflected millimeter wave, (ii) an attenuation level of the received reflected millimeter wave, (iii) time taken the transmitted millimeter wave to be received by the radar transmitting-receiving section.

The driving assist ECU 10 mixes the standing object information provided from the camera sensor 11 and the standing object information provided from the radar sensor 12 to acquire the standing object information having high accuracy.

Hereinafter, information on the situation surrounding the own vehicle and ahead of the own vehicle acquired from the camera sensor 11 and the radar sensor 12, will be referred to as "surrounding situation information."

The buzzer 13 sounds when the buzzer 13 receives a buzzer sound signal from the driving assist ECU 10. The driving assist ECU 10 causes the buzzer 13 to sound when the driving assist ECU 10 should inform driving assist states to the driver. In addition, the driving assist ECU 10 causes the buzzer 13 to sound when the driving assist ECU 10 should alert the driver.

The setting operation device 14 is an operation device used by the driver to carry out various settings. The setting operation device 14 may be provided on a steering wheel of the own vehicle. When the driving assist ECU 10 receives setting signals from the setting operation device 14, the driving assist ECU 10 executes various setting processes. For example, the setting operation device 14 is used by the driver to start and stop operating the driving assist systems described later. In addition, the setting operation device 14 is used by the driver to set parameters used in the driving assist systems to desired values. The parameters used in the driving assist systems may include the movement speed of the own vehicle and an inter-vehicle distance.

The meter ECU 20 is electrically connected to a display device 21. The display device 21 may be a multi-information display provided in front of a driver's seat. The display device 21 displays various information in addition to meters indicating measured values such as the movement speed of the own vehicle. For example, when the meter ECU 20 receives a display command from the driving assist ECU 10, depending on driving assist states, the meter ECU 20 causes the display device 21 to display images specified by the received display command. The display device 21 may be a head-up display (not shown) in place of or in addition to the multi-information display. When the head-up display is employed as the display device 21, an ECU dedicated to control displaying of the head-up display may be provided.

The electric power steering ECU 30 is a control unit which controls an electric power steering apparatus of the own vehicle. Hereinafter, the electric power steering ECU 30 will be referred to as "the EPS ECU 30." The EPS ECU 30 is electrically connected to a motor driver 31. The motor driver 31 is electrically connected to a turning motor 32. The turning motor 32 is installed in a steering mechanism (not shown) of the own vehicle. The steering mechanism includes the steering wheel, a steering shaft coupled to the steering wheel, and a steering gear mechanism. The EPS ECU 30 acquires the steering torque applied to the steering wheel by the driver from the steering torque sensor provided on the steering shaft. The EPS ECU 30 controls energization of the motor driver 31 to drive the turning motor 32, based on the acquired steering torque. An assist steering torque is applied to the steering mechanism by driving of the turning motor 32. Steering operation of the driver is assisted by the applied assist steering torque.

When the EPS ECU 30 receives a steering command from the driving assist ECU 10 via the CAN 100, the EPS ECU 30 drives the turning motor 32 by a control amount specified by the steering command to generate the steering torque. The generated steering torque is different from the assist steering torque applied to the steering mechanism for reducing the steering torque applied to the steering wheel by the driver's steering operation. The generated steering torque is a torque applied to the steering mechanism by the steering command sent from the driving assist ECU 10 without the driver's steering operation.

The engine ECU 40 is electrically connected to engine actuators 41. The engine actuators 41 changes driving states of an internal combustion engine 42. In this embodiment, the internal combustion engine 42 is a gasoline-fuel-injection spark-ignition multi-cylinder engine. The internal combustion engine 42 includes a throttle valve which adjusts intake air amount. The engine actuators 41 include a throttle valve actuator which changes an opening degree of the throttle valve. The engine ECU 40 changes a torque generated by the internal combustion engine 42 by driving the engine actuators 41. The torque generated by the internal combustion engine 42 is transmitted to driven wheels (not shown) of the own vehicle via the transmission (not shown). The engine ECU 40 can change an acceleration state or an acceleration of the own vehicle by controlling the engine actuators 41 to control a driving force applied to the own vehicle.

The brake ECU 50 is electrically connected to brake actuators 51. The brake actuators 51 are provided in a hydraulic circuit between a master cylinder (not shown) and a respective friction brake mechanism 52. The master cylinder compresses hydraulic oil, depending on a pressing force applied to the brake pedal by the driver. The friction brake mechanisms 52 are provided, corresponding to a left front wheel, a right front wheel, a left rear wheel, and a right rear wheel of the own vehicle, respectively. Each of the friction brake mechanisms 52 includes a brake disc 52a and a brake caliper 52b. The brake disc 52a is secured to the respective wheel. The brake caliper 52b is secured to a body of the own vehicle. Each of the brake actuators 51 adjusts hydraulic pressure applied to a respective wheel cylinder (not shown), depending on a command sent from the brake ECU 50. The wheel cylinders are installed in the respective brake calipers 52b. Each of the wheel cylinders are activated by the adjusted hydraulic pressure. Each of brake pads (not shown) are pressed to the respective brake discs 52a to generate a braking force by activation of the wheel cylinder. Thereby, the brake ECU 50 can control the braking force applied to the own vehicle by controlling the brake actuators 51.

Next, the driving assist systems installed in the driving assist ECU 10 will be described.

<PCS System>

The PCS system is one of the driving assist systems installed in the driving assist ECU 10. The PCS system is a system which generates an alerting sound and controls the braking force applied to the own vehicle to assist the driver's operation to avoid the own vehicle from colliding with obstacles detected ahead of the own vehicle. When the PCS system operates, the driving assist ECU 10 specifies the obstacle ahead of the own vehicle, based on the surrounding situation information provided from the camera sensor 11 and the radar sensor 12 and determines a possibility that the own vehicle collides with the detected obstacle. In particular, the driving assist ECU 10 calculates a predicted collision time TTC, based on a distance Dr between the own vehicle and the obstacle ahead of the own vehicle and a movement speed Vr of the obstacle relative to the own vehicle (TTC=Dr/Vr). The predicted collision time TTC is time predicted to be taken the own vehicle to collide with the obstacle. The predicted collision time TTC is used as an index value representing the possibility that the own vehicle collides with the obstacle. The possibility that the own vehicle collides with the obstacle increases as the predicted collision time TTC decreases. In other words, emergency level increases as the predicted collision time TTC decreases.

When the predicted collision time TTC decreases to an alert level, the driving assist ECU 10 causes the buzzer 13 to sound. In addition, the driving assist ECU 10 sends a braking promotion displaying command to the meter ECU 20 to cause the display device 21 to display characters "Braking!" to alert the driver. In addition, the driving assist ECU 10 sends a compressing assist command to the brake ECU 50 to assist compressing the brake hydraulic, thereby to improve a braking effect accomplished by the driver pressing the brake pedal. When the predicted collision time TTC further decreases to an automatic braking level, the driving assist ECU 10 sends an automatic braking command to the brake ECU 50 to generate a predetermined friction braking force, independently of the driver's operation to the brake pedal.

The operation of the PCS system can assist the driver's driving operation to avoid the own vehicle from colliding with the obstacle or reduce damage caused by the own vehicle colliding with the obstacle.

<ACC System>

The ACC system is one of the driving assist systems installed in the driving assist ECU 10. The ACC system causes the own vehicle to move at the movement speed set by the driver's operation to the setting operation device 14, thereby to assist the driver's driving operation to the acceleration and brake pedals when the driver selects a constant movement speed control mode by operating the setting operation device 14. When the driver selects a following movement control mode by operating the setting operation device 14, the ACC system causes the own vehicle to move, following a preceding vehicle moving ahead of the own vehicle, thereby to assist the driver's driving operation to the acceleration and brake pedals.

When the ACC system operates, and the following movement control mode is selected, the driving assist ECU 10 determines whether there are other vehicles moving in an own movement lane ahead of the own vehicle, based on the surrounding situation information provided from the camera sensor 11 and the radar sensor 12. The own movement lane is a lane in which the own vehicle moves. When the driving assist ECU 10 determines that there are the other vehicles moving in the own movement lane ahead of the own vehicle, the driving assist ECU 10 selects the other vehicle nearest the own vehicle as the preceding vehicle. The driving assist ECU 10 calculates a target acceleration of the own vehicle to move the own vehicle, following the preceding vehicle with keeping the distance between the own vehicle and the preceding vehicle at a predetermined inter-vehicle distance. When the driving assist ECU 10 determines that there is no preceding vehicle, the driving assist ECU 10 calculates the target acceleration of the own vehicle to move the own vehicle at the movement speed set by the driver's operation to the setting operation device 14, similar to the constant movement speed control mode.

The driving assist ECU 10 calculates a requested driving force for accelerating the own vehicle at the target acceleration. In this regard, when the target acceleration is negative, the driving assist ECU 10 calculates the requested driving force for decelerating the own vehicle at the target acceleration. The driving assist ECU 10 sends a driving command representing the requested driving force to the engine ECU 40. Thereby, the driving force is controlled to accelerate or decelerate the own vehicle at the target acceleration. When the requested driving force is negative, and an absolute value of the requested driving force is large, i.e., the large braking force is requested to be applied to the own vehicle, and the requested braking force cannot be generated by controlling the internal combustion engine 42 and the transmission (not shown), the engine ECU 40 sends a braking command to the brake ECU 50 to cause the friction brake mechanisms 52 to generate a difference between the requested braking force and the braking force generated by controlling the internal combustion engine 42 and the transmission.

The operation of the ACC system can assist the driver's operation to the acceleration and brake pedals.

<LTA System>

The LTA system is one of the driving assist systems installed in the driving assist ECU 10. The LTA system assists a part of the driver's steering operation to the steering wheel by causing the buzzer 13 to sound, alerting the driver with the display device 21, and controlling the steering of steered wheels when the own vehicle may deviate from the own movement lane. The LTA system assists the driver's steering operation to the steering wheel by controlling the steering of the steered wheels so as to move the own vehicle along a center line of the own movement lane when the ACC system operates.

When the LTA system operates, the driving assist ECU 10 recognizes a relationship between the own vehicle and each lane marking, based on the surrounding situation information provided from the camera sensor 11 and recognizes the preceding vehicle, based on the surrounding situation information provided from the camera sensor 11 and the radar sensor 12. The camera sensor 11 sets the center line of the own movement lane between the recognized left lane marking and the recognized right lane marking as a target movement line. Then, the camera sensor 11 calculates a yaw angle, an offset amount, and a road curvature. The yaw angle is an angle between an extending direction of the target movement line and a movement direction of the own vehicle. The offset amount is a distance of a position of a gravity of the own vehicle relative to the target movement line in the width direction of the own vehicle. The road curvature is a curvature of the target movement line. The camera sensor 11 provides the calculated yaw angle, the calculated offset amount, and the calculated road curvature to the driving assist ECU 10.

The driving assist ECU 10 calculates a target steering angle to move the own vehicle along the target movement line, based on the yaw angle, the offset amount, and the road curvature. The driving assist ECU 10 sends the steering command representing the calculated target steering angle to the EPS ECU 30. Thereby, the own vehicle is caused to move along the center line of the own movement lane with the ACC system operating.

As described above, the operation of the LTA system can assist the driver's steering operation to the steering wheel.

<RSA System>

The RSA system is one of the driving assist systems installed in the driving assist ECU 10. The RSA system recognizes the road signs ahead of the own vehicle and provides information on the recognized road signs to the driver.

When the RSA system operates, and the camera sensor 11 detects the road signs ahead of the own vehicle, the camera sensor 11 provides the information on the detected road signs to the driving assist ECU 10. Hereinafter, the information on the road signs will be referred to as "the road sign Information." The driving assist ECU 10 sends a road sign displaying command to the meter ECU 20, based on the road sign information provided from the camera sensor 11. The road sign information displaying command includes the road sign information. Thereby, the contents described on the road signs are displayed on the display device 21, and the driver is informed of the contents described on the road signs.

The road sign information may include maximumly-permitted movement speed information, vehicle entry forbiddance information, vehicle stop information, and vehicle run-over forbiddance information. Therefore, only when the camera sensor 11 detects a maximumly-permitted movement speed road sign, a vehicle entry forbiddance road sign, a vehicle stop road sign, or a vehicle run-over forbiddance road sign, the camera sensor 11 sends the road sign information on the detected road sign(s) to the driving assist ECU 10. The driving assist ECU 10 sends the road sign information displaying command to the meter ECU 20 each time the driving assist ECU 10 is provided with the road sign information from the camera sensor 11. Thereby, the content(s) represented by the road sign information is/are displayed on the display device 21.

Thereby, the operation of the RSA system assists the driver to easily realize road situations limited by the road signs.

Figure 2:
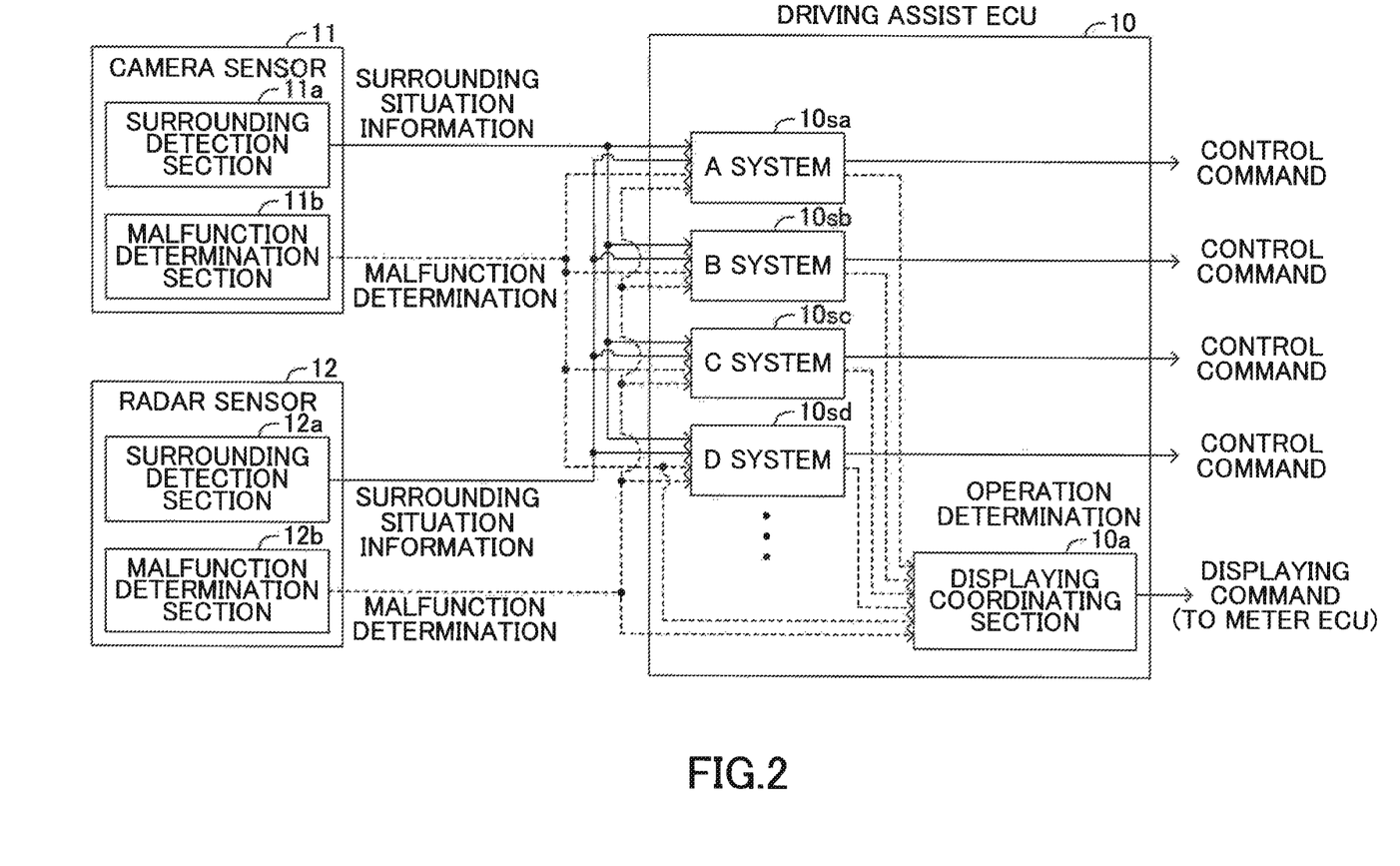
FIG. 2 is a view which shows a block diagram describing a malfunction informing functions.

Next, malfunctions of the sensors which detect the situations surrounding the own vehicle, I.e., the camera sensor 11 and the radar sensor 12 will be described. In addition, a configuration to inform the operable driving assist systems to the driver will be described. FIG. 2 is a block diagram describing malfunction informing functions.

The camera sensor 11 includes a surrounding situation detection section 11a and a malfunction determination section 11b. The camera sensor 11 a is a functional section which detects the situations surrounding the own vehicle. The malfunction determination section 11b determines whether the camera sensor 11 malfunctions. The surrounding situation detection section 11a outputs the surrounding situation information acquired by the camera sensor 11. The malfunction determination section 11b outputs a malfunction determination signal representing that the camera sensor 11 malfunctions or does not malfunction.

The radar sensor 12 includes a surrounding situation detection section 12a and a malfunction determination section 12b. The surrounding situation detection section 12a is a functional section which detects the situation surrounding the own vehicle. The malfunction determination section 12b determines whether the radar sensor 12 malfunctions. The surrounding situation detection section 12a outputs the surrounding situation information acquired by the radar sensor 12. The malfunction determination section 12b outputs a malfunction determination signal representing that the radar sensor 12 malfunctions or does not malfunction.

The driving assist ECU 10 is installed with the different kinds of the driving assist systems. Here, the driving assist systems are an A system 10sa, a B system 10sb, a C system 10sc, a D system 10sd, and the like. The A system 10sa may be the PCS system, the B system 10sb may be the ACC system, the C system 10sc may be the LTA system, and the D system 10sd may be the RSA system. Hereinafter, these systems will be collectively referred to as "the driving assist systems 10s."

The driving assist ECU 10 includes a displaying coordinating section 10a in addition to the driving assist systems 10s.

The driving assist systems 10s are provided with the surrounding situation information from the camera sensor 11, the malfunction determination signal from the camera sensor 11, the surrounding situation information from the radar sensor 12, and the malfunction determination signal from the radar sensor 12. Each of the driving assist systems 10s determines whether the driving assist system 10s is operable, based on the malfunction determination signal provided from the camera sensor 11 and the malfunction determination signal provided from the radar sensor 12. Each of the driving assist systems 10s outputs an operation determination signal representing a result of determining whether the driving assist system 10s are operable to the displaying coordinating section 10a.

When each of the driving assist systems 10s determines that it is operable, based on the malfunction determination signals from the camera sensor 11 and the radar sensor 12, each of the driving assist systems 10s sends control commands to the CAN 100 at starting the driving assist system 10s. For example, when the PCS system determines that it is operable, the PCS system sends the braking promotion displaying command and/or the automatic braking command to the CAN 100. When the ACC system determines that it is operable, the ACC system sends the driving command depending on the target acceleration to the CAN 100. When the LTA system determines that it is operable, the LTA system sends the steering command representing the target steering angle to the CAN 100. When the RSA system determines that it is operable, the RSA system sends the road sign information displaying command to the CAN 100.

When the driving assist system 10s determines that it is inoperable, based on the malfunction determination signals provided from the camera sensor 11 and the radar sensor 12, the driving assist system 10s stops its control operation.

The malfunction determination signals as well as the operation determination signals are input to the displaying coordinating section 10a from the camera sensor 11 and the radar sensor 12. Thus, the displaying coordinating section 10a can realize that each of the forward sensors (i.e., the camera sensor 11 and the radar sensor 12) malfunctions or does not malfunctions. In addition, the displaying coordinating section 10a can realize that the driving assist systems 10s are operable or inoperable, respectively.

The operation of the driving assist system 10s is forbidden, depending on malfunctioning situations of the forward sensors (i.e., the camera sensor 11 and the radar sensor 12). In other word, the driving assist system 10s is not permitted to operate, depending on the malfunctioning situations of the forward sensors (i.e., the camera sensor 11 and the radar sensor 12). Some of the driving assist systems 10s are forbidden to operate when at least one of the camera sensor 11 and the radar sensor 12 malfunctions. Some of the driving assist systems are not forbidden to operate when the radar sensor 12 malfunctions, but the camera sensor 11 does not malfunction. In other words, some of the driving assist systems are operable when the radar sensor 12 malfunctions, but the camera sensor 11 does not malfunction. As understood above, the operation determination signals sent from the driving assist systems 10s are different, depending on the malfunctioning situations of the forward sensors (i.e., the camera sensor 11 and the radar sensor 12).

Figure 3:
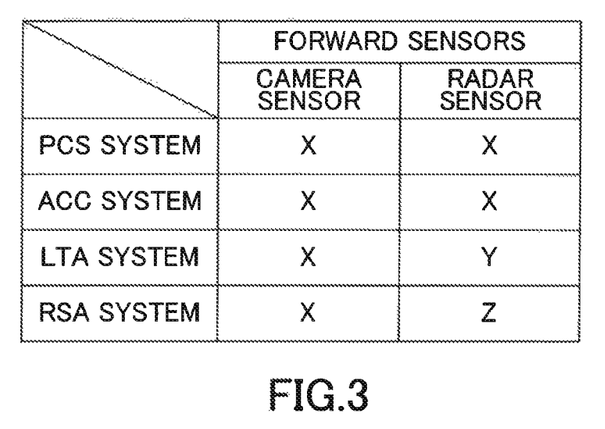
FIG. 3 is a view which shows a relationship between driving assist systems, a camera sensor, and a radar sensor.

FIG. 3 shows operation determinations relating to the PCS, ACC, LTA, and RSA systems. As shown in FIG. 3, the PCS system uses the camera sensor 11 and the radar sensor 12 and is operable when the camera sensor 11 and the radar sensor 12 do not malfunction. Also, the ACC system uses the camera sensor 11 and the radar sensor 12 and is operable when the camera sensor 11 and the radar sensor 12 do not malfunction. The LTA system uses the camera sensor 11 and the radar sensor 12 and is operable when the camera sensor 11 does not malfunction. The RSA system uses the camera sensor 11 and is operable when the camera sensor 11 does not malfunction.

In particular, the PCS system and the ACC system use the camera sensor 11 and the radar sensor 12 as the forward sensors. The PCS system and the ACC system are permitted to operate when an operation permission condition that the camera sensor 11 and the radar sensor 12 do not malfunction, is satisfied. Therefore, when at least one of the camera sensor 11 and the radar sensor 12 malfunctions, the PCS system and the ACC system are forbidden to operate. Thus, the PCS system and the ACC system output the operation determination signal representing that the PCS system and the ACC system are not permitted to operate.

On the other hand, the LTA system uses the camera sensor 11 and the radar sensor 12 as the forward sensors. The LTA system is permitted to operate when an operation permission condition that the camera sensor 11 does not malfunction, is satisfied. Therefore, the LTA system is permitted to operate when the camera sensor 11 does not malfunction, but the radar sensor 12 malfunctions. Thus, the LTA system outputs the operation determination signal that the LTA system is operable when the camera sensor 11 does not malfunction, but the radar sensor 12 malfunctions. In this case, the driver can use the LTA system.

The RSA system uses the camera sensor 11 only as the forward sensors. Thus, the RSA system is permitted to operate when the operation permission condition that the camera sensor 11 does not malfunction, is satisfied. Therefore, the RSA system is operable when the camera sensor 11 does not malfunction, but the radar sensor 12 malfunctions. Thus, the RSA system outputs the operation determination signal representing that the RSA system is operable when the camera sensor 11 does not malfunction, but the radar sensor 12 malfunctions. In this case, the driver can use the RSA system.

For example, when any of the forward sensors malfunctions, the driving assist ECU 10 may cause the display device 21 to display that any of the forward sensors malfunctions to have the driver realize that any of the forward sensors malfunctions. In particular, when any of the camera sensor 11 and the radar sensor 12 malfunctions, the driving assist ECU 10 may cause the display device 21 to display that any of the camera sensor 11 and the radar sensor 12 malfunctions to have the driver realize that any of the camera sensor 11 and the radar sensor 12 malfunctions. In this regard, when the driving assist ECU 10 simply causes the display device 21 to display that any of the forward sensors, the driver may realize that the driver cannot use all of the driving assist systems. However, the driver may be able to use some of the driving assist systems, depending on a malfunctioning situation of the forward sensors. In this case, the driver cannot use the driving assist systems effectively.

Accordingly, the vehicle driving assist apparatus according to the embodiment is configured to display a list indicating (i) the driving assist system(s) which the driver can use and (ii) the driving assist system(s) which the driver cannot use. In other words, the vehicle driving assist apparatus according to the embodiment is configured to display a list indicating (i) the driving assist system(s) which can provide the driver with the driving assist and (ii) the driving assist system(s) which cannot provide the driver with the driving assist. Thereby, the driver can realize (i) the driving assist system(s) which the driver can use and (ii) the driving assist system(s) which the driver cannot use.

Figure 4:
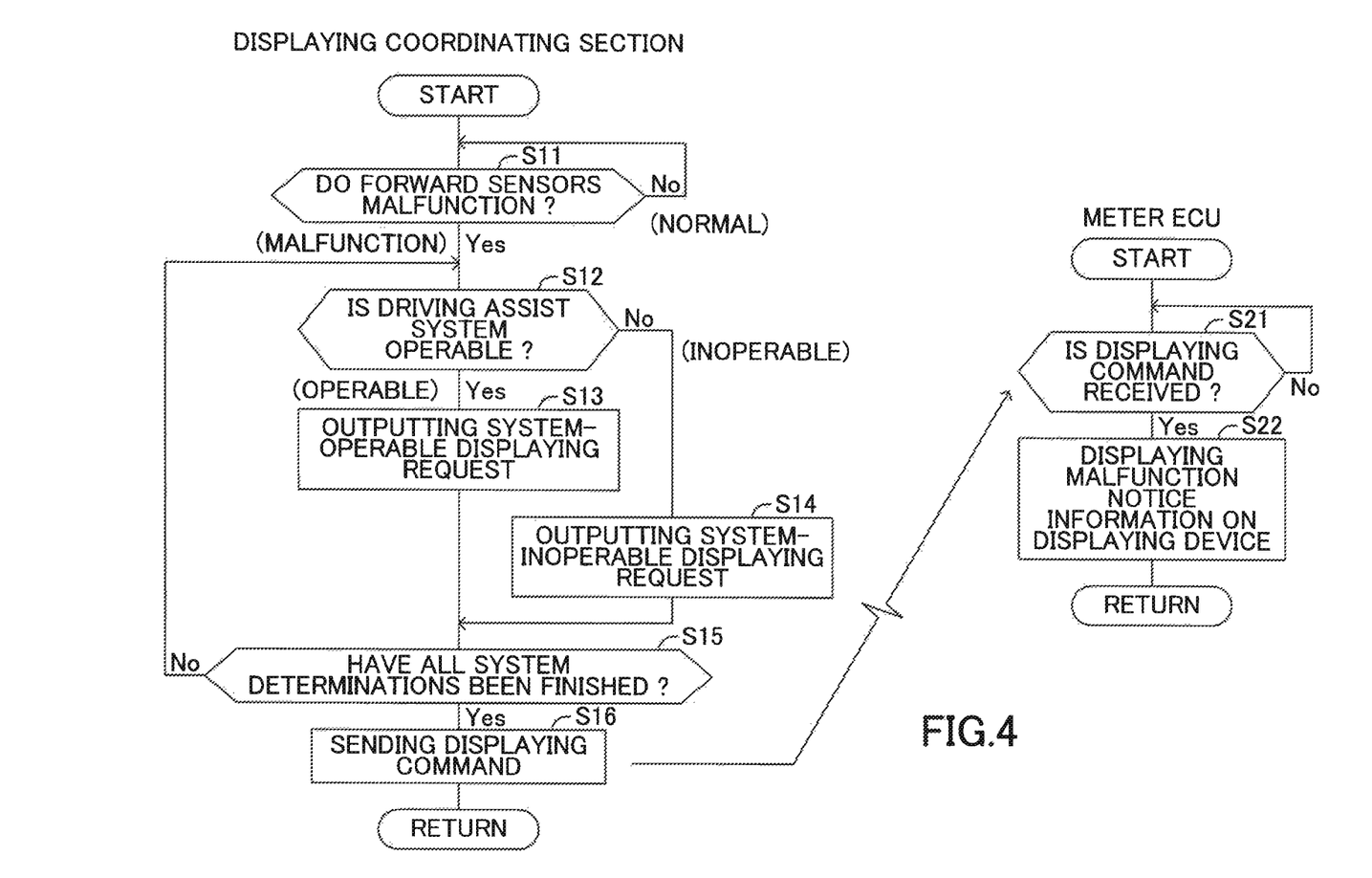
FIG. 4 is a view which shows a flowchart of a malfunction displaying coordinating routine (left side) executed by a displaying coordinating section and a display routine (right side) executed by a meter ECU.

To this end, the displaying coordinating section 10a executes a displaying coordinating process described below. FIG. 4 shows a malfunction displaying coordinating routine executed by the displaying coordinating section 10a at a left side and a displaying routine executed by the meter ECU 20 at a right side.

When the displaying coordinating section 10a starts executing the malfunction displaying coordinating routine, the displaying coordinating section 10a proceeds with the process to a step S11 to determine whether any of the forward sensors malfunctions, based on the malfunction determination signal relating to the camera sensor 11 and the malfunction determination signal relating to the radar sensor 12. When the forward sensors do not malfunction, the displaying coordinating section 10a returns the process to the step S11. In other words, when the camera sensor 11 and the radar sensor 12 do not malfunction, the displaying coordinating section 10a returns the process to the step S11. The displaying coordinating section 10a executes a determination process of the step S11 repeatedly while the displaying coordinating section 10a determines that the forward sensors do not malfunction.

When the displaying coordinating section 10a determines that any of the forward sensors malfunctions, the displaying coordinating section 10a proceeds with the process to a step S12. In other words, when the displaying coordinating section 10a determines that at least one of the camera sensor 11 and the radar sensor 12 malfunctions, the displaying coordinating section 10a proceeds with the process to the step S12. At the step S12, the displaying coordinating section 10a inputs the operation determination signal relating to one of the driving assist systems into the displaying coordinating section 10a and determines whether the one of the driving assist systems is operable, based on the input operation determination signal. When the operation determination signal represents that the one of the driving assist systems is operable, the driver can use the one of the driving assist systems. On the other hand, when the operation determination signal represents that the one of the driving assist systems is inoperable, the driver cannot use the one of the driving assist systems.

When the one of the driving assist systems is operable, the displaying coordinating section 10a determines "Yes" at the step S12 and proceeds with the process to a step S13 to output a system-operable displaying request which requests the display device 21 to display that the one of the driving assist systems is operable.

On the other hand, when that the one of the driving assist systems is inoperable, the displaying coordinating section 10a determines "No" at the step S12 and proceeds with the process to a step S14 to output a system-inoperable displaying request which requests the display device 21 to display that the one of the driving assist systems is inoperable. The displaying requests output at the steps S13 and S14 are memorized in the memory. The memorized displaying requests are sent with a malfunction displaying command at a step S16 described later.

Then, the displaying coordinating section 10a proceeds with the process to a step S15 to determine whether system-operable determination processes are finished for all the driving assist systems. The system-operable determination process is a process to whether the driving assist system is operable. When the system-operable determination processes are not finished for all the driving assist systems, the displaying coordinating section 10a determines "No" at the step S15 and executes the determination process of the step S12 to determine whether the driving assist system(s) not subject to the system-operable determination processes is/are operable.

The displaying coordinating section 10a executes the process of the step S12 until the system-operable determination processes are finished for all the driving assist systems. When the system-operable determination processes are finished for all the driving assist systems, the displaying coordinating section 10a determines "Yes" at the step S15 and proceeds with the process to a step S16 to send a malfunction displaying command to the meter ECU 20. The malfunction displaying command includes malfunctioning part information and system-operable determination information. The malfunctioning part information is information on the malfunctioning forward sensor(s). The system-operable determination information is information on whether the driving assist systems are operable. The system-operable determination information includes the system-operable displaying request and the system-inoperable displaying request.

When the displaying coordinating section 10a finishes sending the malfunction displaying command at the step S16, the displaying coordinating section 10a terminates the malfunction displaying coordinating routine once. The displaying coordinating section 10a starts executing the malfunction displaying coordinating routine each time a predetermined time elapses from terminating the malfunction displaying coordinating routine.

The meter ECU 20 determines whether the meter ECU 20 receives the malfunction displaying command at a step S21. When the meter ECU 20 does not receive the malfunction display command, the meter ECU 20 returns the process to the step S21. The meter ECU 20 executes a determination process of the step S21 until the meter ECU 20 receives the malfunction displaying command.

When the malfunction display command is sent to the meter ECU 20 from the displaying coordinating section 10a, the meter ECU 20 receives the malfunction display command and determines "Yes" at the step S21. Then, the meter ECU 20 proceeds with the process to a step S22 to display malfunction notice information on the display device 21 in accordance with the malfunction display command.

Figure 5:
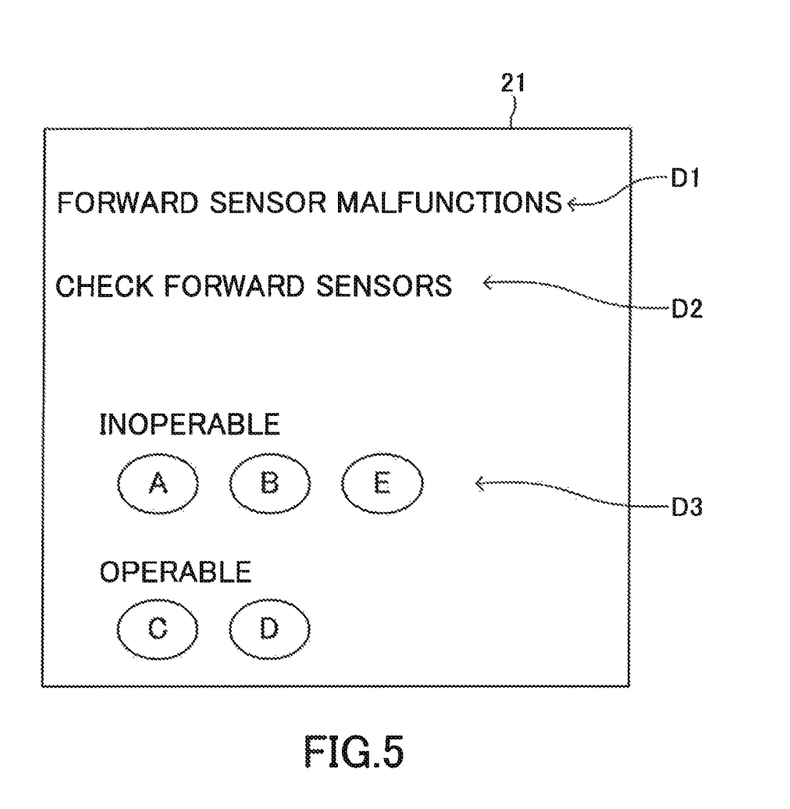
FIG. 5 is a front view which shows a display.

FIG. 5 shows a displayed image on the display device 21 displaying the malfunction notice information. A malfunctioning parts display D1, a checking display D2, and an assist situation display D3 are displayed on the display device 21. The malfunctioning parts display D1 informs that at least one of the forward sensors malfunctions with characters. The checking display D2 informs that the forward sensors need to be checked. The assist situation display D3 informs the inoperable driving assist system(s) and the operable das(s). In the assist situation display D3, the inoperable driving assist system(s) is/are displayed in one group, and the operable driving assist system(s) is/are displayed in another group. The operable driving assist system(s) is/are the driving assist system(s) leading to outputting of the system-operable displaying request at the step S13. The inoperable driving assist system(s) is/are the driving assist system(s) leading to outputting of the system-inoperable displaying request at the step S14.

As shown in FIG. 4, the assist situation display D3 is displayed, simply using characters "A", "B", "C", "D", and "E." Actually, the assist situation display D3 is displayed, using simple symbols simply showing names of the driving assist systems such as "PCS", "ACC", and the like. Alternatively, the assist situation display D3 is displayed, using marks which provide the driver with assist contents of the driving assist systems. That is, the assist situation display D3 is displayed so as to provide the driver with the kinds of the driving assist systems.

In this regard, the operable driving assist system(s) and the inoperable driving assist system(s) may be displayed in different colors. The operable driving assist system(s) may be displayed in amber, and the inoperable driving assist system(s) may be displayed in white.

In an example shown in FIG. 4, the C and D systems are operable, and the A and B systems are inoperable. The driver can realize that at least one of the forward sensors malfunctions, the operable das(s), and the inoperable driving assist system(s) from the image displayed on the display device 21 at a glance.

When the meter ECU 20 executes a process of the step S22, the meter ECU 20 terminates the displaying routine once. The meter ECU 20 starts executing the displaying routine each time the predetermined time elapses after the meter ECU 20 terminates the displaying routine.

According to the vehicle driving assist apparatus of the embodiment described above, the driver can realize the operable driving assist system(s) and the inoperable driving assist system(s) at a glance when one of the forward sensors malfunctions. Thus, the driver can use the driving assist systems effectively.

For example, it is difficult for the driver to realize the operable driving assist system(s) when some of the driving assist systems become inoperable, and the images displayed on the display device 21, corresponding to the inoperable driving assist systems change in a sequentially order. According to the vehicle driving assist apparatus of the embodiment, all information is displayed in the screen of the display device 21. Thus, the driver can easily realize the operable driving assist system(s) and the inoperable driving assist system(s). In addition, the inoperable driving assist system(s) is/are displayed in one group, and the operable driving assist system(s) is/are displayed in another group. Thus, the driver can easily realize the operable driving assist system(s) and the inoperable driving assist system(s).

Further, according to the vehicle driving assist apparatus of the embodiment, characters "CAMERA SENSOR" and "RADAR SENSOR" are not used in the malfunctioning parts display D1, and characters "FORWARD SENSOR" representing the camera sensor 11 and the radar sensor 12 is used in the malfunctioning parts display D1. The driver may not require that the characters "CAMERA SENSOR" and "RADAR SENSOR" are used in the malfunctioning parts display D1. In addition, when the characters "CAMERA SENSOR" and "RADAR SENSOR" are used in the malfunctioning parts display D1, the driver may be confused. Therefore, the driver can easily realize the malfunctioning parts by displaying that the forward sensor malfunctions in the malfunctioning parts display D1.

The vehicle driving assist apparatus according to the embodiment of the present disclosure has been described. It should be noted that the present disclosure is not limited to the aforementioned embodiments, and various modifications can be employed within the scope of the present disclosure.

The driving assist systems of the embodiment are the driving assist systems using the forward sensors. In this regard, the present disclosure may be applied to the driving assist system using rearward sensors such as a left rear radar sensor which detects the situation surrounding the own vehicle behind the own vehicle at the left side of the own vehicle and a right rear radar sensor which detects the situation surrounding the own vehicle behind the own vehicle at the right side of the own vehicle. Alternatively, the present disclosure may be applied to the driving assist system using forward sensors such as a left front radar sensor which detects the situation surrounding the own vehicle ahead of the own vehicle at the left side of the own vehicle and a right front radar sensor which detects the situation surrounding the own vehicle ahead of the own vehicle at the right side of the own vehicle.

The vehicle driving assist apparatus of the embodiment is the vehicle driving assist apparatus in which the displaying coordinating section 10a inputs therein the operation determination signals sent from the driving assist systems 10s and determines which driving assist system(s) is/are operable and inoperable. The present disclosure may be applied to the vehicle driving assist apparatus other than the vehicle driving assist apparatus of the embodiment. The present disclosure may be applied to the vehicle driving assist apparatus configured such that the displaying coordinating section 10a memorizes a relationship between the malfunction(s) of the sensor(s) and whether the driving assist systems are operable as shown in FIG. 3 and determines whether each of the driving assist systems is operable or inoperable, based on the memorized relationship and the malfunction determination signals output from the sensors.

What is claimed is:

1. A vehicle driving assist apparatus comprising:
   surrounding sensors which detect situations surrounding an own vehicle as vehicle surrounding situations the surrounding sensors include a camera sensor and a radar sensor that detect a situation ahead of the own vehicle as the vehicle surrounding situation; and
   driving assist systems which assist a driving operation of a driver, based on the vehicle surrounding situations detected by the surrounding sensors,
   wherein the vehicle driving assist apparatus further comprises at least one electronic control unit configured to:
   determine whether the surrounding sensors malfunction;
   when the at least one electronic control unit determines that at least one of the surrounding sensors malfunctions, determine (i) operable driving assist systems corresponding to the driving assist systems which can provide the driver with driving assist in a situation that at least one of the surrounding sensors malfunctions and (ii) inoperable driving assist systems corresponding to the driving assist systems which cannot provide the driver with the driving assist in a situation that at least one of the surrounding sensors malfunctions; and
   when the at least one electronic control unit determines that at least one of the surrounding sensors malfunctions, cause a display device to display both of (i) a display indicating that at least one of the surrounding sensors malfunctions by specifically identifying and displaying by name (a) that the camera sensor has malfunctioned when the at least one electronic control unit determines camera sensor has malfunctioned, (b) that the radar sensor has malfunctioned when the at least one electronic control unit determines that the radar sensor has malfunctioned, or (c) that the camera sensor and the radar sensor have malfunctioned when the at least one electronic control unit determines that the camera sensor and the radar sensor have malfunctioned and (ii) a display indicating a list of at least two of the operable driving assist systems in one group and the inoperable driving assist systems in another group such that the display of the operable driving assist systems and the inoperable driving assist systems are both displayed simultaneously in a manner that the driver can visually determine which driving assist systems are operable and which driving assist systems are inoperable based on the simultaneously display of the operable driving assist systems and the inoperable driving assist systems in separate groups.

2. The vehicle driving assist apparatus as set forth in claim 1, wherein the display device further comprises:
a first display section that includes a malfunctioning parts display indicating that the at least one of the surrounding sensors malfunctions;
a second display section that includes a checking parts display indicating, when one of the camera sensor and the radar sensor malfunctions, to check one of the one of the camera sensor and the radar sensor malfunctions; and
a third display section that includes an assist situation display that indicates the list of the operable driving assist systems in the one group and the inoperable driving assist systems in the another group.

3. The vehicle driving assist apparatus as set forth in claim 1, wherein the list of the operable driving assist systems in the one group and the inoperable driving assist systems in the another group are displayed specifically identifying by the name the driving assist systems.

4. The vehicle driving assist apparatus as set forth in claim 1, wherein the list of the operable driving assist systems in the one group are displayed in a first color and the inoperable driving assist systems in the another group are displayed in a second color, the first color is different from the second color.

5. A vehicle driving assist apparatus, comprising:
a first surrounding sensor which detects a first vehicle surrounding situation corresponding to a situation surrounding an own vehicle to which the vehicle driving assist apparatus is applied, the first surrounding sensor is a camera sensor;
a second surrounding sensor which detects a second vehicle surrounding situation corresponding to the situation surrounding the own vehicle, the second surrounding sensor is a radar sensor; and
at least one electronic control unit which executes (i) a first driving assist system for assisting a driving operation of a driver of the own vehicle, using the first vehicle surrounding situation and the second vehicle surrounding situation and (ii) a second driving assist system for assisting the driving operation, using the first vehicle surrounding situation without using the second vehicle surrounding situation, and execute a third driving assist system for assisting the driving operation of the driver, using at least one of the first vehicle surrounding situation and the second vehicle surrounding situation;
wherein the at least one electronic control unit is configured to:
determine whether the first surrounding sensor malfunctions and whether the second surrounding sensor malfunctions; and
cause a display device of the own vehicle to display that (i) at least one of the first and second surrounding sensors malfunctions by specifically identifying and displaying by name (a) that the camera sensor has malfunctioned when the at least one electronic control unit determines that first surrounding sensor has malfunctioned, (b) that the radar sensor has malfunctioned when the at least one electronic control unit determines that the second surrounding sensor has malfunctioned, or (c) that the camera sensor and the radar sensor have malfunctioned when the at least one electronic control unit determines that the first surrounding sensor and the second surrounding sensor have malfunctioned, (ii) the first driving assist system is inoperable, and (iii) the second driving assist system is operable when the at least one electronic control unit determines that the first surrounding sensor does not malfunction, and the second surrounding sensor malfunctions,
wherein the display of the first driving assist system is inoperable is displayed in one group, the display of the second driving assist system and the third driving assist system is operable is displayed in another group such that a list of at least two of the operable driving assist systems is displayed in one group and the inoperable driving assist systems in another group, the display of the first driving assist system and the display of the second driving assist system and the third driving assist system are all displayed simultaneously in a manner such that the driver can visually determine which driving assist systems are operable and which driving assist systems are inoperable.

6. The vehicle driving assist apparatus as set forth in claim 4, wherein the at least one electronic control unit is further configured to:
cause the display device to display operable driving assist systems of the first to third driving assist systems in the one group and inoperable driving assist systems of the first to third driving assist systems in the another group when the at least one electronic control unit determines that the first surrounding sensor does not malfunction, and the second surrounding sensor malfunctions.

7. The vehicle driving assist apparatus as set forth in claim 4, wherein:
the first surrounding sensor detects a situation ahead of the own vehicle as the first vehicle surrounding situation; and
the second surrounding sensor detects a situation ahead of the own vehicle as the second vehicle surrounding situation.

8. The vehicle driving assist apparatus as set forth in claim 5, wherein the vehicle driving assist apparatus further comprises a setting operation device operated by the driver to operate the first and second driving assist systems, respectively.

9. The vehicle driving assist apparatus as set forth in claim 5, wherein:
the first driving assist system automatically controls at least one of an acceleration, a deceleration and a steering of the own vehicle; and
the second driving assist system automatically controls at least one of the acceleration, the deceleration and the steering of the own vehicle.

10. The vehicle driving assist apparatus as set forth in claim 5, wherein the display device further comprises:
a first display section that includes a malfunctioning parts display indicating that the at least one of the surrounding sensors malfunctions;
a second display section that includes a checking parts display indicating, when one of the camera sensor and the radar sensor malfunctions, to check one of the one of the camera sensor and the radar sensor malfunctions; and
a third display section that includes an assist situation display that indicates the list of the operable driving assist systems in the one group and the inoperable driving assist systems in the another group.

11. The vehicle driving assist apparatus as set forth in claim 5, wherein the list of the operable driving assist systems in the one group and the inoperable driving assist systems in the another group are displayed specifically identifying by the name the driving assist systems.

12. The vehicle driving assist apparatus as set forth in claim 5, wherein the list of the operable driving assist systems in the one group are displayed in a first color and the inoperable driving assist systems in the another group are displayed in a second color, the first color is different from the second color.

13. A method for a vehicle driving assist, the method comprising:
   detecting, by surrounding sensors, situations surrounding an own vehicle as vehicle surrounding situations, the surrounding sensors include a camera sensor and a radar sensor that detect a situation ahead of the own vehicle as the vehicle surrounding situation;
   assisting a driving operation of a driver, by driving assist systems, based on the vehicle surrounding situations detected by the surrounding sensors,
   determining whether the surrounding sensors malfunction;
   when determined that at least one of the surrounding sensors malfunctions, determining (i) operable driving assist systems corresponding to the driving assist systems which can provide the driver with driving assist in a situation that at least one of the surrounding sensors malfunctions and (ii) inoperable driving assist systems corresponding to the driving assist systems which cannot provide the driver with the driving assist in a situation that at least one of the surrounding sensors malfunctions; and
   when determined that at least one of the surrounding sensors malfunctions, (i) displaying on a display device a display of the surrounding sensors malfunction by specifically identifying and displaying by name (a) that the camera sensor has malfunctioned when the at least one electronic control unit determines camera sensor has malfunctioned, (b) that the radar sensor has malfunctioned when the at least one electronic control unit determines that the radar sensor has malfunctioned, or (c) that the camera sensor and the radar sensor have malfunctioned when the at least one electronic control unit determines that the camera sensor and the radar sensor have malfunctioned, (ii) a display indicating that at least one of the surrounding sensors malfunctions, and (iii) a display indicating a list at least two of the operable driving assist systems in one group and the inoperable driving assist systems in another group such that the display of the operable driving assist systems and the inoperable driving assist systems are both displayed simultaneously in a manner that the driver can visually determine which driving assist systems are operable and which driving assist systems are inoperable.

14. The method as set forth in claim 13, wherein the display device further comprises:
   a first display section that includes a malfunctioning parts display indicating that the at least one of the surrounding sensors malfunctions;
   a second display section that includes a checking parts display indicating, when one of the camera sensor and the radar sensor malfunctions, to check one of the one of the camera sensor and the radar sensor malfunctions; and
   a third display section that includes an assist situation display that indicates the list of the operable driving assist systems in the one group and the inoperable driving assist systems in the another group.

15. The method as set forth in claim 13, wherein the list of the operable driving assist systems in the one group and the inoperable driving assist systems in the another group are displayed specifically identifying by the name the driving assist systems.

16. The method as set forth in claim 13, wherein the list of the operable driving assist systems in the one group are displayed in a first color and the inoperable driving assist systems in the another group are displayed in a second color, the first color is different from the second color.

* * * * *